United States Patent [19]

Omata

[11] Patent Number: 4,468,836
[45] Date of Patent: Sep. 4, 1984

[54] DOOR DAMPENING MECHANISM HAVING A NON-ROTATABLE VANE

[75] Inventor: Nobuaki Omata, Hiroshima, Japan

[73] Assignee: Nifco Inc., Yokohama, Japan

[21] Appl. No.: 325,463

[22] Filed: Nov. 27, 1981

[30] Foreign Application Priority Data

Nov. 27, 1980 [JP] Japan ............................ 55-168752[U]

[51] Int. Cl.³ .............................................. E05F 5/02
[52] U.S. Cl. ............................................ 16/82; 16/85
[58] Field of Search ................... 16/49, 50, 54, 62, 64, 16/68, 69, 82, 85

[56] References Cited

U.S. PATENT DOCUMENTS

| | | | |
|---|---|---|---|
| 1,711,626 | 5/1929 | Webster | 16/62 |
| 1,823,263 | 9/1931 | Fabry | 16/54 |
| 2,018,564 | 10/1935 | Milly | 16/54 X |
| 2,469,488 | 5/1949 | Woods | 16/82 X |
| 2,493,118 | 1/1950 | Diebel | 16/82 |
| 3,952,365 | 4/1976 | Grisebach | 16/82 X |
| 4,342,135 | 8/1982 | Matsuo et al. | 16/82 |

FOREIGN PATENT DOCUMENTS

| | | |
|---|---|---|
| 54-90116 | 6/1979 | Japan . |
| 55-52878 | 4/1980 | Japan . |
| 55-75805 | 5/1980 | Japan . |

Primary Examiner—Fred Andrew Silverberg
Attorney, Agent, or Firm—J. R. Halvorsen; T. W. Buckman

[57] ABSTRACT

A damper for the door of a cassette housing in a cassette tape recorder is formed by unrotatably inserting a resisting member provided with radially extended vanes around a support shaft protuberating from a base plate and setting the resisting member within a cup-shaped rotary member thereby allowing the vanes to slide frictionally on the inner wall surface of the rotary member. This damper is mounted in the machine proper of the recorder by fastening the resisting member to the machine proper through the medium of the fitting member and pivotally attaching the door to the rotary member by utilization of a rack and pinion. The opening and closing motion of the door is braked by the frictional slide of the resisting member on the inner wall surface of the rotary member. Thus, the shocks and vibration produced by the opening and closing motion of the door are abated.

5 Claims, 5 Drawing Figures

DOOR DAMPENING MECHANISM HAVING A NON-ROTATABLE VANE

BACKGROUND OF THE INVENTION

This invention relates to damper means for the door such as of a cassette housing in a cassette tape recorder, to be used for the purpose of abating the shocks produced in consequence of the opening and closing of the door.

Generally in the conventional cassette tape recorder, the cassette housing is so constructed that the opening of the door thereof is effected by manipulating an ejector button thereby allowing the cassette housing to fly open by the resilient force of a spring, for example, and the closing thereof by just pushing the cassette housing down against the resilient force of the spring thereby allowing the cassette housing to snap into position. In the construction wherein the opening and closing of the door are effected by such means as a spring or a lever, for example, the door is destined to produce vibration and shock whenever it is opened and closed. At times, the impacts of the repeated opening and closing of the door have eventually reached the extent of producing adverse effects upon the delicate quality of the recorder. In the circumstance, there has recently been disseminated a practice of adopting damper means of some sort or other for use in the mechanism for opening and closing the door of the cassette housing in the cassette tape recorder.

Dampers of various constructions have been proposed for this purpose. For example, Japanese Utility Model Laid-Open Publication No. 90116/1979 discloses a door operating mechanism which comprises a cylinder rotatably mounted in the body of the recorder, a rod piston pivotally attached to the door of the cassette housing and encased together with a spring within the same cylinder, and a viscous substance contained within the cylinder for the purpose of abating the impact of the motion of door opening and closing; Japanese Utility Model Laid-Open Publication No. 52878/1980 discloses a device wherein a braking rotator mounted on the pivotal shaft of the door and adapted to be expanded outwardly by the centrifugal force of the rotation of the shaft of the door is encased within a stationary drum, and at the time that the door is opened or closed, the braking rotator is allowed to expand and slide on the inner wall surface of the stationary drum and consequently apply brakes to the motion of the door opening or closing; and Japanese Utility Model Laid-Open Publication No. 75805/1980 discloses a device wherein a braking member is encased within a cylinder fastened to the body of the recorder and an engaging shaft is interlocked with the braking member in such a manner that the shaft keeps an effectively meshed engagement with the braking member in one rotary direction thereof and an idle engagement therewith in the other rotary direction, whereby brakes are applied to the door when the door is opened and no brakes are applied when the door is closed.

The conventional damper means including those cited above invariably use many component parts. These component parts tend to have complicate designs and, consequently, are difficult to fabricate and assemble. These damper means inevitably turn out to be expensive and susceptible to mechanical troubles during service. Thus, various faults have been found with the conventional damper means.

SUMMARY OF THE INVENTION

An object of this invention is to provide a damper means for the door which comprises a small number of component parts so simple in design as to permit easy fabrication and assembly and which continues to produce the required shock-absorbing effect stably for a long time.

To accomplish the object described above according to the present invention, there is provided a damper means for the door which comprises a fitting member formed of a base plate and a support shaft protruding from the center of the base plate, a resisting member formed of a cylindrical shaft and vanes provided radially on the cylindrical shaft, and a cup-shaped rotary member provided on one flat face thereof with a toothed wheel.

This damper means can be assembled simply by unrotatably attaching the resisting member to the support shaft of the fitting member and inserting into the rotary member the resisting member already fitted integrally into the fitting member in such a manner that the vanes of the resisting member frictionally slides on the inner wall surface of the rotary member. In the construction described above, the damper means of this invention comprises only three component parts of a synthetic resin very easy to assemble.

The incorporation of this damper means into the cassette tape recorder is accomplished by fastening the fitting member of the damper means to the machine proper of the tape recorder and pivotally attaching the rotary member of the damper means to the machine proper by allowing the rack gear provided on the door of the cassette housing to be meshed with the toothed wheel of the rotary member. Once the damper means is thus set fast in the tape recorder, the opening or closing motion of the door of the cassette housing is braked by the frictional slide of the rotary member on the resisting member. Thus, the damper means provides effective abatement of the shock and vibration caused by the opening or closing motion of the door.

The other objects and characteristics of the present invention will become apparent from the further disclosure of the invention to be made hereinafter with reference to the accompanying drawings.

DESCRIPTION OF THE PREFERRED EMBODIMENT

This invention relates to a damper means of a simple construction, designed to abate the impact arising from the opening and closing motion of the door of the cassette housing in a cassette tape recorder.

Figure 1:
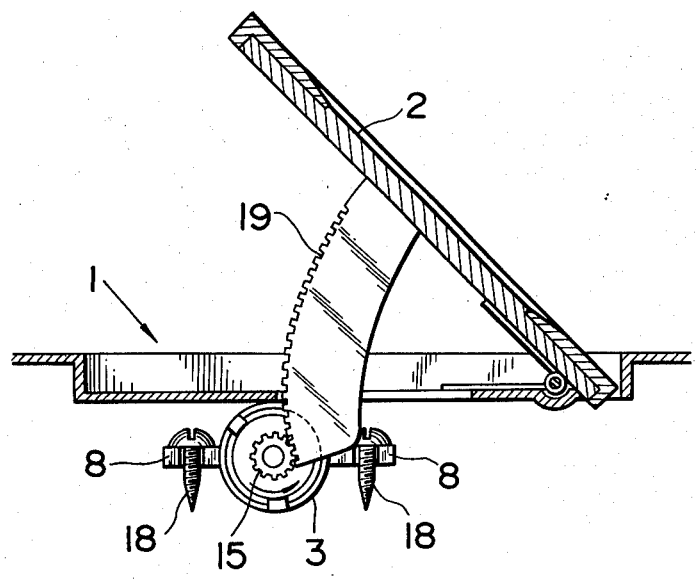
FIG. 1 is a plan view showing the manner of use of the damper means of this invention.
Figure 2:
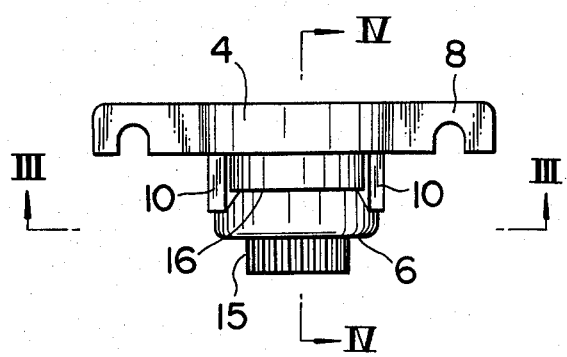
FIG. 2 is an enlarged plan view of the damper means.

In FIG. 1, 1 denotes a cassette housing which is provided in the machine proper such as a cassette tape recorder, 2 a door attached freely openably to the opening of the cassette housing through the medium of hinges, and 3 the damper means of the present invention provided therein for the purpose of abating the impacts causable during the opening or closing of the door.

Figure 5:
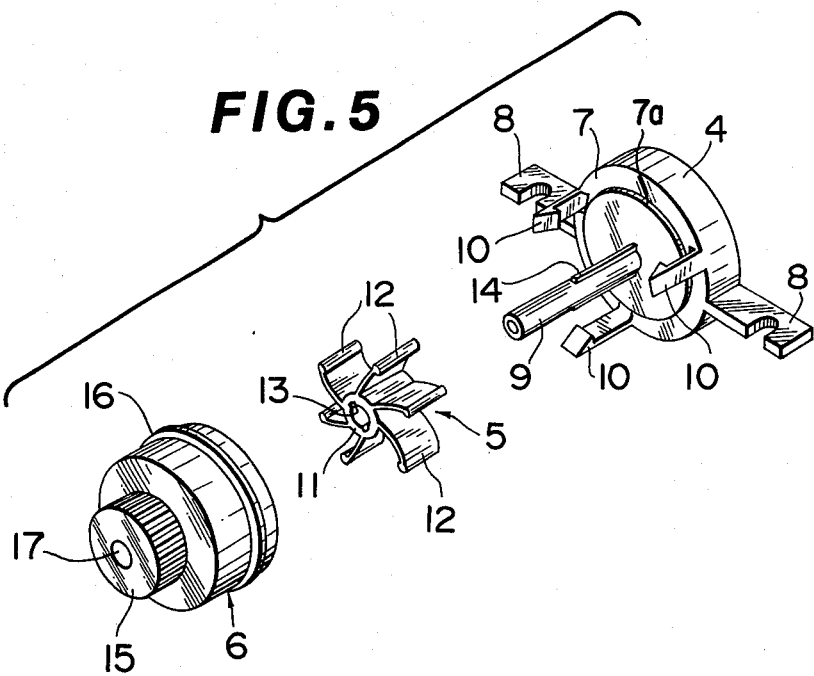
FIG. 5 is an exploded perspective view of the damper means.

As illustrated in FIG. 5, the damper means 3 comprises a fitting member 4, a resisting member 5, and a rotary member 6. The fitting member 4 has a circular base plate 7 and a raised circular extension forming bearing surface 7a. Base plate 7 is provided on its peripheral surface with fitting pieces 8 and at the center of the circular extension with a vertically protuberating support shaft 9. From the peripheral portion of the base plate 7, three engaging claws 10 are raised parallel to the support shaft 9 as spaced equally in the circumferential direction so as to enclose the support shaft therein. The resisting member 5 has at the center thereof a bearing or hub 11 of a cylindrical shape and is provided on the peripheral surface of the bearing 11 with a multiplicity of vanes 12 generally radially extended and equally spaced in the circumferential direction. The bore of the hub 11 has a diameter approximating the diameter of the support shaft 9 of the fitting member 4. This hub 11 is provided on the inner wall surface thereof with two grooves or slots 13 diametrically opposed to each other and running parallel to the axial direction of the bearing. These grooves are formed so as to complimentarily mate with the two axially extending ribs or ridges 14 formed on the peripheral surface of the support shaft 9, when the hub 11 is telescoped over the shaft. The vanes 12 in the illustrated embodiment are formed each in the shape of a shallow arc so that when any external force is exerted upon the leading ends of the vanes, the vanes will bend resiliently by virtue of the arcs. Further, the free or leading ends of the vanes are formed in straight edges running parallel to the axial direction of the bearing, and preferably include a radiused bead extending transversely of each vane, with the edges collectively falling on the curved surface of an imaginary cylinder of predetermined diameter.

The rotary member 6 has the shape of a cup and is provided on the closed end surface thereof with an integral gear 15. This rotary member has a depth large enough to encase wholly the resisting member 5. It has an inside diameter slightly smaller than the diameter of the imaginery circle containing all the leading ends of the vanes 12 of the resisting member 5, so that when the resisting member is encased within the rotary member, the leading ends of the vanes 12 are forced to slide intimately on the inner wall surface of the rotary member. The rotary cup-shaped member 6 is provided circumferentially on the peripheral surface thereof with an annular rib or check portion 16. It is also provided at the center of the aforementioned closed end surface with a perforation 17 extending through the core of the gear toothed wheel 15.

Figure 3:
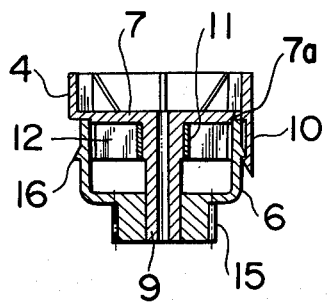
FIG. 3 is a sectioned view taken along the line III—III in FIG. 2.
Figure 4:
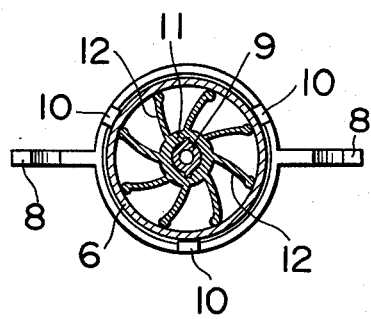
FIG. 4 is a sectioned view taken along the line IV—IV in FIG. 2.

These component parts of the damper means, namely, the fitting member 4, the resisting member 5, and the rotary member 6 are separately formed of a thermoplastic synthetic resin. When they are put together in the following sequence, they complete the damper means. The first step to the assemblage is to insert the bearing 11 of the resisting member 5 around the support shaft 9 of the fitting member 4 and fit the ridges 14 into the grooves 13 formed in the inner wall surface of the bearing so as to have the resisting member 5 nonrotatably fixed on the fitting member 4. Then, the rotary member 6 is set around the resisting member in such a manner as to enclose the resisting member wholly. Consequently, the vanes 12 of the resisting member are caused to slide on the inner wall surface of the rotary member and, at the same time, the leading end of the support shaft 9 protruding from the bearing 11 of the resisting member 5 is received into the perforation 17. Further, the rotary member is pressed toward the fitting member side until the engaging claws 10 raised from the peripheral portion of the circular base plate 7 snap into engagement with the annular check portion 16 and the interior of the open end of the cup-shaped rotary member 6 rests on the bearing surface 7a, as seen in FIG. 3, to thereby support the rotary member at two axially spaced bearing points and to form a union between the rotary member and the fitting member. Thus, the damper means is assembled. Alternatively, the assemblage of the damper means may be effected by first inserting the resisting member 5 within the rotary member 6, then passing the support shaft 9 of the fitting member through the bearing 11 of the resisting member thereby causing the resisting member to be borne on the fitting member and, at the same time, allowing the engaging claws 10 of the fitting member to snap into fast engagement with the annular check portion 16. The procedure of the assemblage has no effect whatever on the actual performance of the damper means.

The damper means of the present invention which has been assembled as described above is mounted on the cassette tape recorder by fastening the fitting pieces 8 of the fitting member with screws 18 to the opening of the cassette housing 1 and bringing the arcuate toothed piece 19 hanging from the door 2 into mesh with the toothed wheel 15 provided on the rotary member 6 as illustrated in FIG. 1. In this arrangement, the rotary member 6 is rotated by the toothed piece 19 which is moved when the door is opened and closed.

Since the leading radiused beaded ends of the vanes 12 of the fixed resisting member encased within the rotary member 6 resiliently slide on the inner wall surface of the cup-shaped barrel of the rotary member 6, the rotary member 6 is subject to the friction resistance. Thus, the rotation of the rotary member is retarded by this frictional resistance and, consequently, the door is prevented from being abruptly opened or closed.

Where the door provided for the cassette housing is energized by a spring so as to be automatically opened on being released from a lock device, the damper means of the present invention permits effective abatement of the sharp leap of the door from the lock. The damper means similarly functions when the door is closed. Thus, the impacts produced on the tape and the tape recorder by the opening and closing motions of the door can be notably abated.

The damper means of this invention is composed of a small number of component parts as described above. Moreover, these component parts have simple shapes enough to permit easy fabrication. They are so constructed that they can be readily assembled by being merely set into each other. Thus, the damper means can be manufactured very easily and can be provided at a low price.

What is claimed is:

1. A three piece plastic damper means for a door, comprising a fitting member provided with a base plate and a support shaft raised perpendicularly from the center of said base plate, nonrotating resisting member provided with a hub fixedly mounted on said shaft and a multiplicity of vanes extending radially from the peripheral surface of said hub, and a cup-shaped rotary member integrally provided at its substantially closed end with a gear toothed wheel, said resisting member being fit into said rotary member, and said vanes being allowed to frictionally slide intimately on the inner wall surface of the rotary member.

2. The damper means according to claim 1, wherein the fitting member is provided on the peripheral portion thereof with a plurality of engaging claws extended in spaced parallel relation to the support shaft, the rotary member is provided on the peripheral surface thereof with an annular check portion, whereby the rotary member can be freely rotatably attached to the fitting member by causing said engaging claws to snap into fast engagement with said check portion.

3. The damper means according to claim 1, wherein the fitting member is provided on the peripheral surface of the support shaft thereof with ridges running parallel to the axial direction of the fitting member, the resisting member is provided on the inner wall surface of the bore of the hub thereof with grooves, and the grooves and the ridges are matched so that when they are fit together, whereby the resisting member is nonrotatably fixed relative to the support shaft of the fitting member.

4. The damper means according to claim 1, wherein the vanes of the resisting member are formed in the shape of arcs so as to enhance resiliency.

5. The damper means according to claim 1, wherein the leading ends of the vanes are formed in beaded straight edges running parallel to the axial direction of the bore of the hub and said straight edges collectively fall in the curved surface of an imaginary cylinder having a diameter at least as great as the diameter of said cup-shaped rotary member.

* * * * *